United States Patent [19]

Kleinhuizen

[11] Patent Number: 4,886,124
[45] Date of Patent: Dec. 12, 1989

[54] SOIL GRADING APPARATUS WITH SIFTING AND TRANSPORTING CAPABILITY

[76] Inventor: David W. Kleinhuizen, 18431 Henna Ave. North, Forest Lake, Minn. 55025

[21] Appl. No.: 141,977

[22] Filed: Jan. 11, 1988

[51] Int. Cl.[4] .................. A01B 17/00; A01B 31/00
[52] U.S. Cl. ........................ 172/32; 172/445.1; 172/684.5; 172/199; 172/612
[58] Field of Search .............. 172/32, 445.1, 684.5, 172/701.1, 701.3, 197, 199, 200, 784, 799.5, 612; 37/108 R

[56] References Cited

U.S. PATENT DOCUMENTS

| | | | |
|---|---|---|---|
| 1,445,506 | 2/1923 | Gorhy | 172/684.5 |
| 1,530,329 | 3/1925 | Roberts | 172/684.5 X |
| 1,569,421 | 1/1926 | Coelho | 172/612 X |
| 2,095,428 | 10/1937 | Batie | 172/32 X |
| 2,166,596 | 7/1939 | Johnson | 172/684.5 |
| 2,227,874 | 1/1941 | Bartsch | 172/612 |
| 2,783,698 | 3/1957 | Bambi | 172/32 |
| 3,263,755 | 8/1966 | Zink | 172/612 X |
| 3,463,240 | 8/1969 | Mascaro | 172/189 X |
| 3,556,228 | 1/1971 | Mork | 172/445.1 |
| 4,386,662 | 6/1983 | Kalif | 172/445.1 |
| 4,418,759 | 12/1983 | Mork | 172/197 |
| 4,448,258 | 5/1984 | Mork | 172/445.1 X |
| 4,585,075 | 4/1986 | Mork | 172/445.1 X |

FOREIGN PATENT DOCUMENTS

| | | | |
|---|---|---|---|
| 0711914 | 6/1965 | Canada | 172/32 |
| 0446508 | 4/1936 | United Kingdom | 172/684.5 |
| 0640312 | 7/1950 | United Kingdom | 172/612 |
| 2118412 | 11/1983 | United Kingdom | 172/32 |

Primary Examiner—Randolph A. Reese
Assistant Examiner—Jeffrey L. Thompson
Attorney, Agent, or Firm—Peterson, Wicks, Nemer & Kamrath

[57] ABSTRACT

The apparatus includes a rigid frame having two rectangular openings therein that are covered with sections of expanded metal grating material. The frame has front and rear angled or sloping cutting edges that can cause some of the soil being leveled to be pushed onto the upper side of the grating sections, a tilting of the apparatus increasing the amount. The elevated soil can be sifted downwardly through the grating openings if of small enough size or retained on the sections if oversized. Whatever chunks or clods of soil too large to be sifted can be dumped onto the ground and pulverized by a back and forth movement of the apparatus over the large material with the apparatus appropriately tilted. Rocks and debris can be transported to a disposal location. Replaceable wear strips are employed. However, the edges of the grating sections are welded to the frame at an elevation above the wear strips to reduce the amount of wear on the underside of the sections.

16 Claims, 5 Drawing Sheets

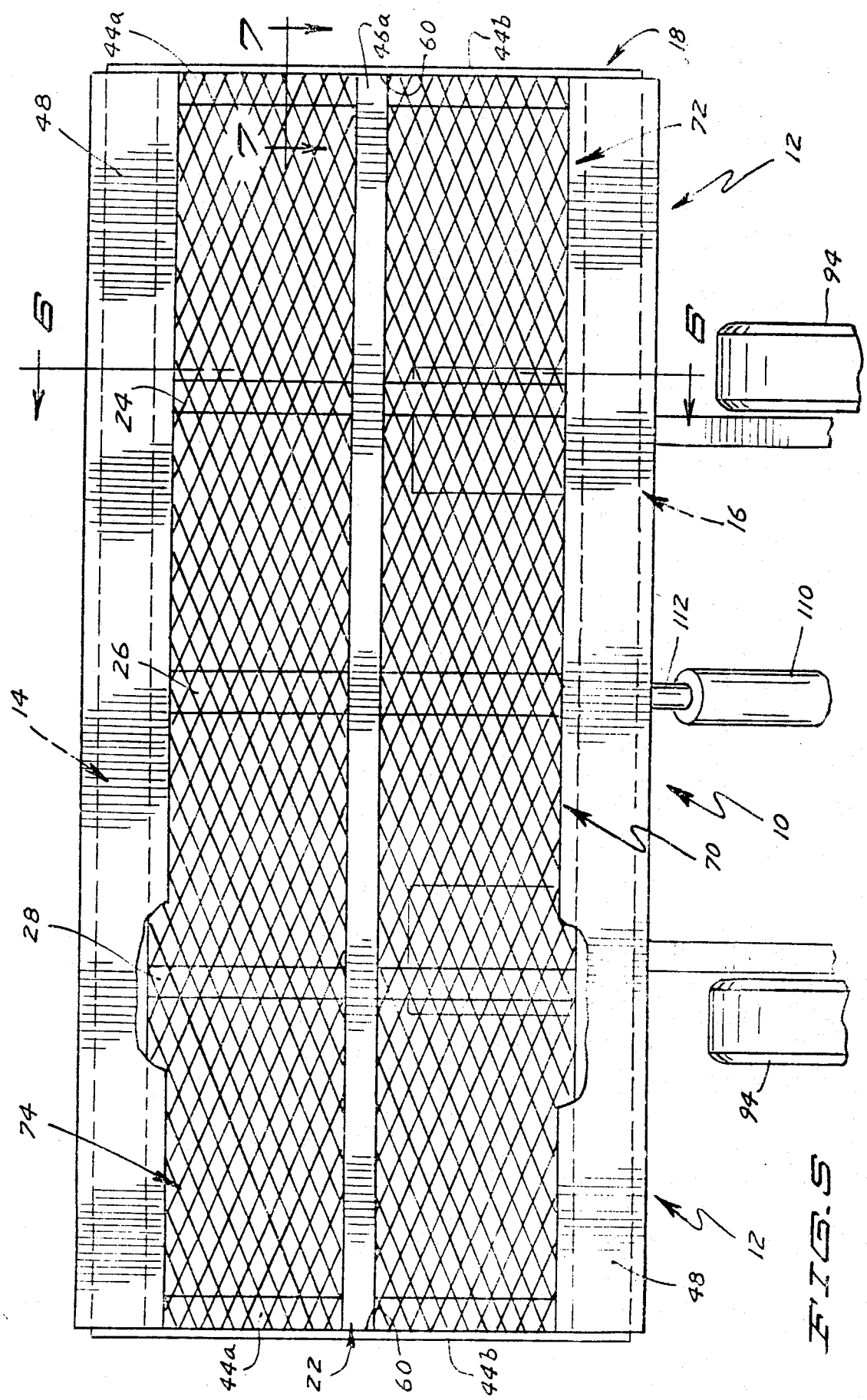

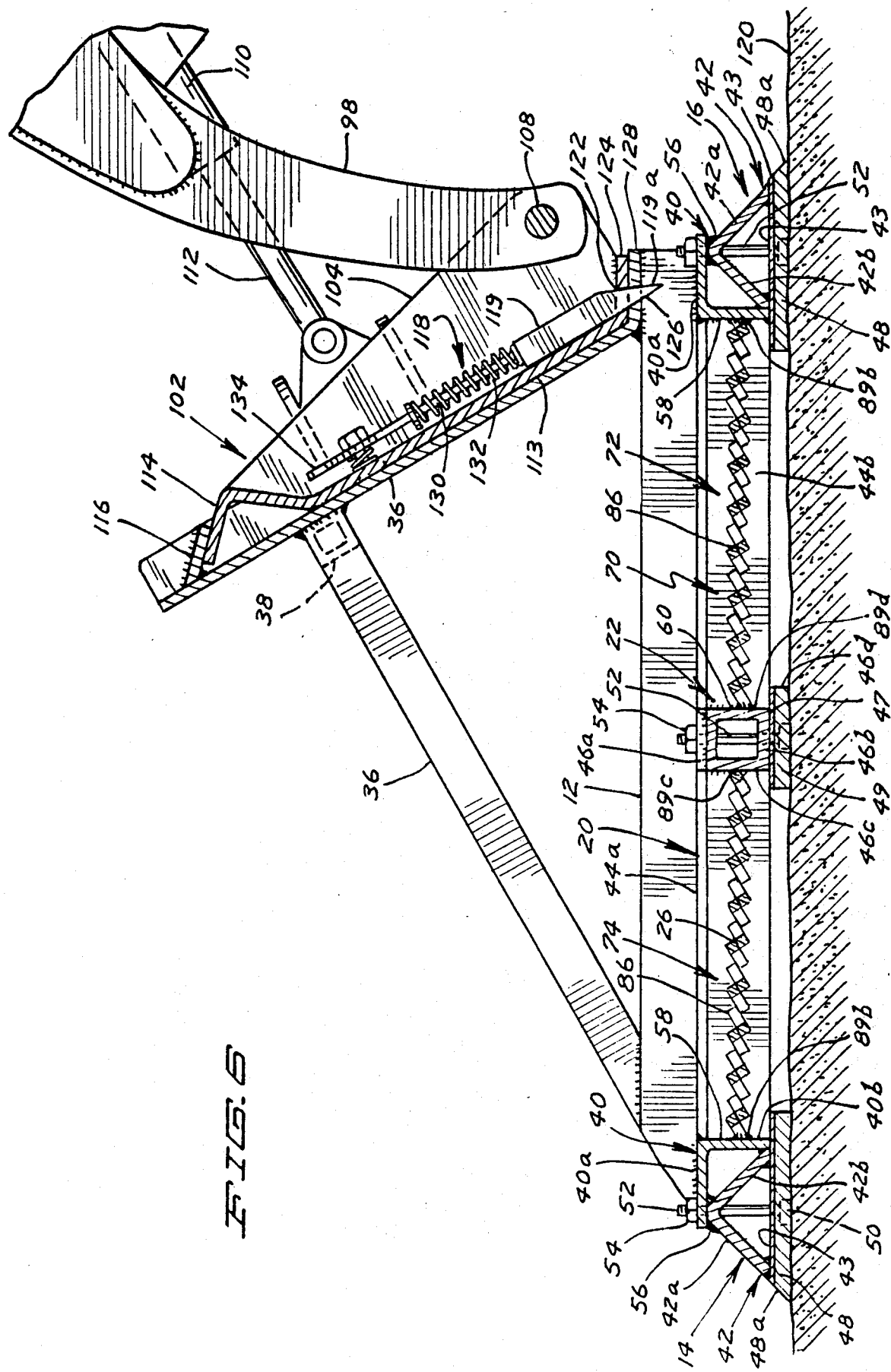

SOIL GRADING APPARATUS WITH SIFTING AND TRANSPORTING CAPABILITY

BACKGROUND OF THE INVENTION

1. Field of Invention

This invention relates generally to grading or leveling apparatus that is attached to the front end of a tractor, and pertains more particularly to apparatus of this character that will additionally perform a sifting operation during the leveling procedure and which will also permit the transporting of the soil so as to more effectively and efficiently complete a leveling operation.

2. Description of the Prior Art

As pointed out in U.S. Pat. No. 3,556,228 issued on Jan. 19, 1971 to Orlan H. Mork for "APPARATUS FOR LEVELING SOIL AND THE LIKE," weighted boards had been dragged behind tractors in leveling soil, the patentee explaining that such devices were unsatisfactory, attributable to at least some degree to the tendency of the soil to pile up in front of the board and also escape around the outer edges thereof with the consequence that ridges were formed in the surface of the leveled soil. Also, as believed obvious, this type of device is unable to sort out unwanted debris.

To overcome such shortcomings the patentee in the above instance describes a frame comprised of several spaced cross-beams, each performing a scraping function. By tilting the apparatus, the soil, according to the patentee, is prevented from escaping around the edges or over the top of the apparatus.

Improvements over the earlier arrangement are embodied in U.S. Pat. Nos. 4,418,759 issued on Dec. 6, 1983 to the same patentee for "SOIL LEVELING APPARATUS" and in a further improvement set forth in U.S. Pat. No. 4,448,258 granted on May 15, 1984 to the same patentee for "SOIL LEVELING APPARATUS." Basically the improved apparatus eliminates undesirable ridge formations and a lessening of soil build-up along the interior sides of the apparatus because of the open interior design. In each of the patents, the apparatus makes use of transverse or cross-beams with a spacing therebetween providing the open interior design which makes it impossible to achieve any sifting action. Also, since the spacing forming the open interior between the transverse beams is quite appreciable, it follows that soil cannot build-up on the top of the apparatus so that it can be transported from one location to another.

SUMMARY OF THE INVENTION

Accordingly, an important object of my invention is to provide leveling apparatus that employs a grating having openings therein of a size that allow smaller material to fall downwardly through the openings to effect a sifting action at the same time the apparatus is spreading the soil.

Another object of the invention is to provide an apparatus with grating that will enable soil to be accumulated on the upper side of the apparatus so that it can be lifted and transported to another location or be redistributed in the immediate area where the leveling is being undertaken all in furtherance of whatever grading plan is to be carried out.

A further object of the invention is to provide an apparatus that is effective when moved in any direction.

As a more specific object, the invention comtemplates the employment of an angled cutting edge, there being one such edge at the front and one at the rear of the apparatus. These angled cutting edges enable the soil to be pushed onto the top of the apparatus for either sifting back through the openings of the grating or being carried on top of the grating to a different location. The amount of soil that is moved onto the top of the apparatus is controlled by the degree of tilting that is imparted to the apparatus.

Another object is to break up hard mounds of soil, the angled cutting edges mentioned above, together with a tilting of the apparatus, causing the apparatus to take a more severe bite into the soil. This is particularly advantageous where the soil is compacted or composed of a considerable amount of clay which renders the soil quite hard, for the resulting clumps which "ride" onto the top of my apparatus can then be dumped back onto the ground and "pulverized" by moving the apparatus, while tilted, back and forth over the underlying clumps, breaking the hard clumps up to whatever degree is needed.

Yet another object is to provide apparatus of the foregoing character where the grating is attached to the frame of the apparatus at a location above the bottom of the apparatus thereby minimizing the wear on the underside of the grating and thus prolonging the life of the grating. In other words, the grating, when practicing my invention, need be replaced only at infrequent intervals.

Still another object of the invention, which is allied with the object just above, is the provision of wear strips that can be replaced as circumstances dictate. Because the grating is anchored at an elevation above the bottom surfaces of the wear strips the underside of the grating scrapes along only the soil that has been loosened by the leading wear strip.

A further object of the invention is to provide apparatus that will not form grooves at each side of the apparatus as it is moved over the soil being graded. This feature per se is embodied in the patented structures that have been herein before identified. However, an aim of the present invention is to achieve extremely smooth leveling of the soil without sacrificing the other herein mentioned benefits derivable when utilizing my apparatus.

The invention also has as a still further object the provision of leveling apparatus possessing both a sifting and transporting feature that can be relatively small and compact so that it can be conveniently attached to the front end of a small tractor, thereby making the apparatus especially suitable for landscaping purposes. It is also planned that the apparatus be quite rugged so that it will not be damaged where hard, uneven and rocky terrain is encountered.

Briefly, my invention contemplates the providing of a rigid frame having forwardly and rearwardly disposed wear strips that can be readily replaced. The frame has two rectangular openings, each of which is covered by an expanded grating having openings therein that enable some of the soil that is pushed onto the upper side of the apparatus by means of angled cutting edges to be gravitationally sifted downwardly through the openings yet retain oversize material on top of the apparatus that cannot be broken up, such as stubble, rocks and hard clumps of clay so that they can be discarded. The angled edges at the front and rear of the apparatus enable the apparatus to literally dig into hard soil so as to scoop some of the soil onto the upper side of the apparatus, either to be sifted back through the openings in the grating, dumped onto the ground and pulverized, or to be transported to a different location.

BRIEF DESCRIPTION OF THE DRAWINGS

FIG. 4 is a front elevational view corresponding to FIG. 1 but with my apparatus raised in preparation for transporting oversized material to a disposal site;

FIG. 5 is a bottom plan view of the apparatus;

FIG. 6 is a sectional view taken in the direction of line 6—6 of FIG. 5;

DESCRIPTION OF THE PREFERRED EMBODIMENT

Figure 1:
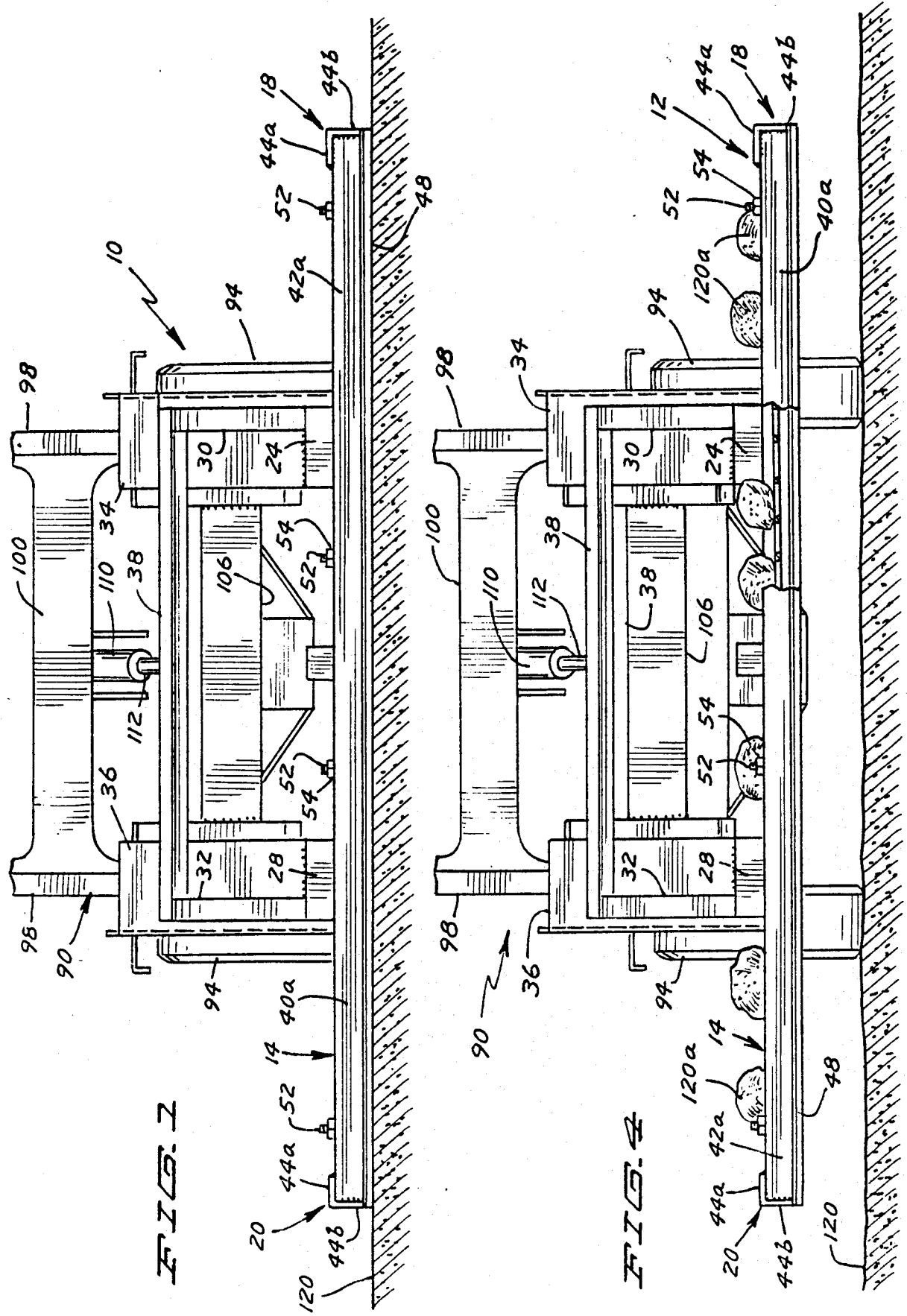
FIG. 1 is a front elevational view of apparatus exemplifying my invention, the apparatus being attached to the front end of a tractor that has been only fragmentarily pictured.

The apparatus that has been selected for illustrating my invention has been denoted generally by the reference numeral 10. It includes a rigid frame unit 12 comprised of a composite forward or front transverse beam 14, a composite rear transverse beam 16, and side beams 18 and 20, each of the beams 18, 20 having an angled cross section. Still further, the frame unit 12 includes an intermediate transverse beam 22 having basically a square cross section plus a trio of additional beams 24, 26 and 28 extending in a parallel direction to the side beams 18 and 20, these latter beams also having a square cross section. The frame unit 12 additionally includes a pair of rearwardly inclining brace beams 30 and 32, the lower or forwardly disposed ends of these beams 30, 32 being welded to the longitudinally directed beams 24, 28. The upper ends of the beams 30, 32 are welded to the forwardly facing sides of a pair of channel members 34 and 36. Extending transversely between the channel members 34, 36 is a cross-beam 38.

At this time attention is directed to the composite construction of the front and rear beams 14 and 16. It will be perceived from FIG. 6 that the construction of the beams 14 and 16 is virtually identical, one beam being the mirror image of the other. Thus, in describing the beams 14 and 16 the same reference numerals will be used to refer to identical, although reversely positioned, elements. With this in mind, it will be noted that each beam 14, 16 includes an angle member 40 having a horizontal flange 40a and a vertical flange 40b. These beams 14 and 16 additionally include another angle member 42 having a sloping flange 42a and a sloping flange 42b. In other words, the apex of each of the angle members 42 is uppermost, residing marginally beneath the horizontal flange 40a belonging to the angle members 40. All that need be appreciated at this point is that the angle members 40 and 42 are welded together and that a flat bottom or base strip 43 is welded to the members 40, 42 to complete the construction of the two individual beams 14 and 16.

Figure 7:
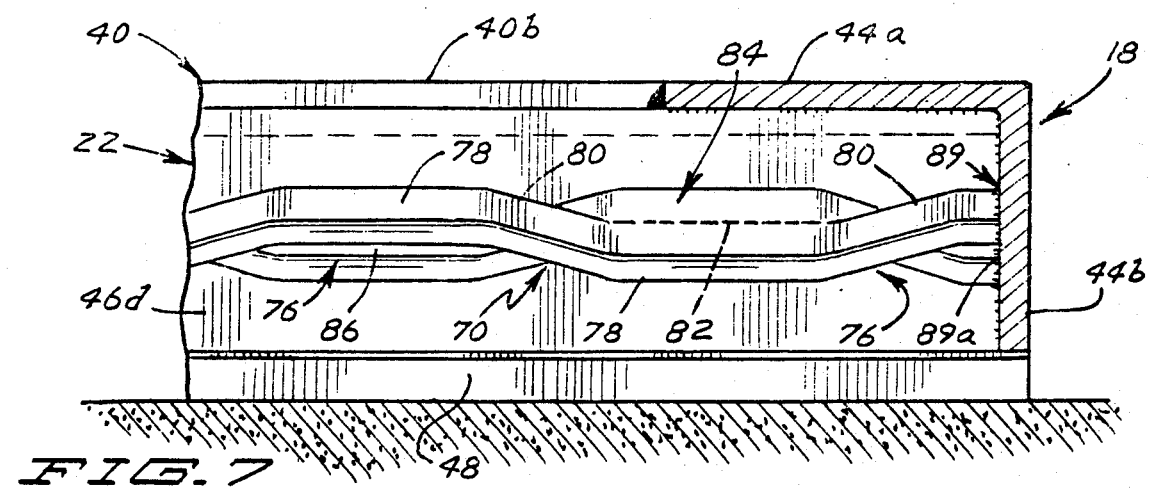
FIG. 7 is an enlarged sectional detail taken in the direction of 7—7 of FIG. 5.

Turning now to a brief description of the side beams 18 and 20, it only has to be repeated that these side beams 18 and 20 constitute two angle members, each having a horizontal flange 44a and a vertical flange 44b. Although only the side beam 18 appears in FIG. 7, it can be seen that the vertical flange 44b provides a relatively narrow lower edge that will not create a groove of any significant width during the leveling procedure.

Next to be referred to is the cross section of the composite transverse beam 22. As previously stated, it has basically a square cross section, more specifically a top wall 46a, a bottom wall 46b, and side walls 46c and 46d. The cross sectional makeup of the beam 22 and its relation to the beams 14 and 16 can be readily understood from FIGS. 5 and 6. As with the beams 14 and 16, a flat bottom or base strip 47 is welded to the underside of the bottom wall 46b to complete the construction of the composite beam 22.

A hardened wear strip 48 is detachably mounted beneath the bottom strips 47 of each of the transverse beams 14 and 16, each having a beveled edge at 48a. The bottom strips serve as backers for the wear strips 48 so that the strips 48 do not bow when attached in the manner now to be described. As can be appreciated from FIG. 6, it will be seen that there is a countersunk hole 50 (appearing in dotted outline) in the lower face of each wear strip 48 which accommodates therein the head of an upwardly directed bolt 52 that passes through the wear strip 48, the bottom strip 43 thereabove, the apex of the angle member 42 and through the marginal portion of the horizontal flanges 40a belonging to the angle member 40. A plurality of transversely spaced bolts 52 are employed for each beam 14 and 16. A nut 54 threaded onto the upper end of each bolt 52 anchors the various bolts 52 so that the two wear strips 48 are pulled upwardly into pressural engagement with the bottom strip 42. As indicated, any suitable number of bolts 52 can be employed, a representative number thereof appearing in FIGS. 1 and 4. Whenever either of the wear strips 48 is to be replaced, one need only remove the nuts 54 so that the appropriate bolts 52 can be taken out of the beam 14 or 16, as the case may be, and a new wear strip 48 installed by simply returning the bolts 52 to the position shown in FIG. 6. Retightening the nuts 54 will again retain each of the wear strips 48 in tight engagement with the undersides of the strips 48.

Another hardened wear strip 49 is similarly attached to the transverse beam 22, additional bolts 52 extending upwardly through the strip 49, the bottom strip 47, the bottom wall 46b and the top wall 46a. Whereas the wear strips 48 have beveled edges 48a the edges of the strip 49 are not beveled.

It is not believed necessary to refer to each and every weld that is employed in assembling the frame unit 12. However, it might be of help to explain that the angle members 40 and 42 are secured together basically by reason of a weld at 56. See FIG. 6. Additional welds can be employed. It is just that the angle members 40, 42 and strips 43 are to be fixedly secured together when fabricating the beams 14 and 16. It should be understood that the ends of the vertical flanges 40b of the angle members 40 are welded to the vertical flanges 44b of the side beams 18 and 20, such as at 58. The ends of the intermediate transverse beam 22 are welded at 60 to the vertical flanges 44b of the side beams 18 and 20. Actually, the weld 60, as can be seen in FIG. 6, extends completely around the ends of the four side walls 46a, 46b, 46c and 46d of the beam 22. As already indicated, the various members constituting the frame unit 12 are fixedly secured together so as to form an exceedingly rigid frame unit 12.

Figure 9:
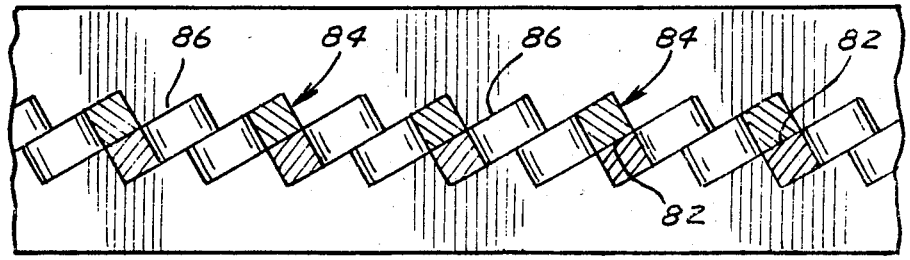
FIG. 9 is a sectional view taken in the direction of line 9—9 of FIG. 8 so as to show to better advantage the slope imparted to the expanded grating.
Figure 8:
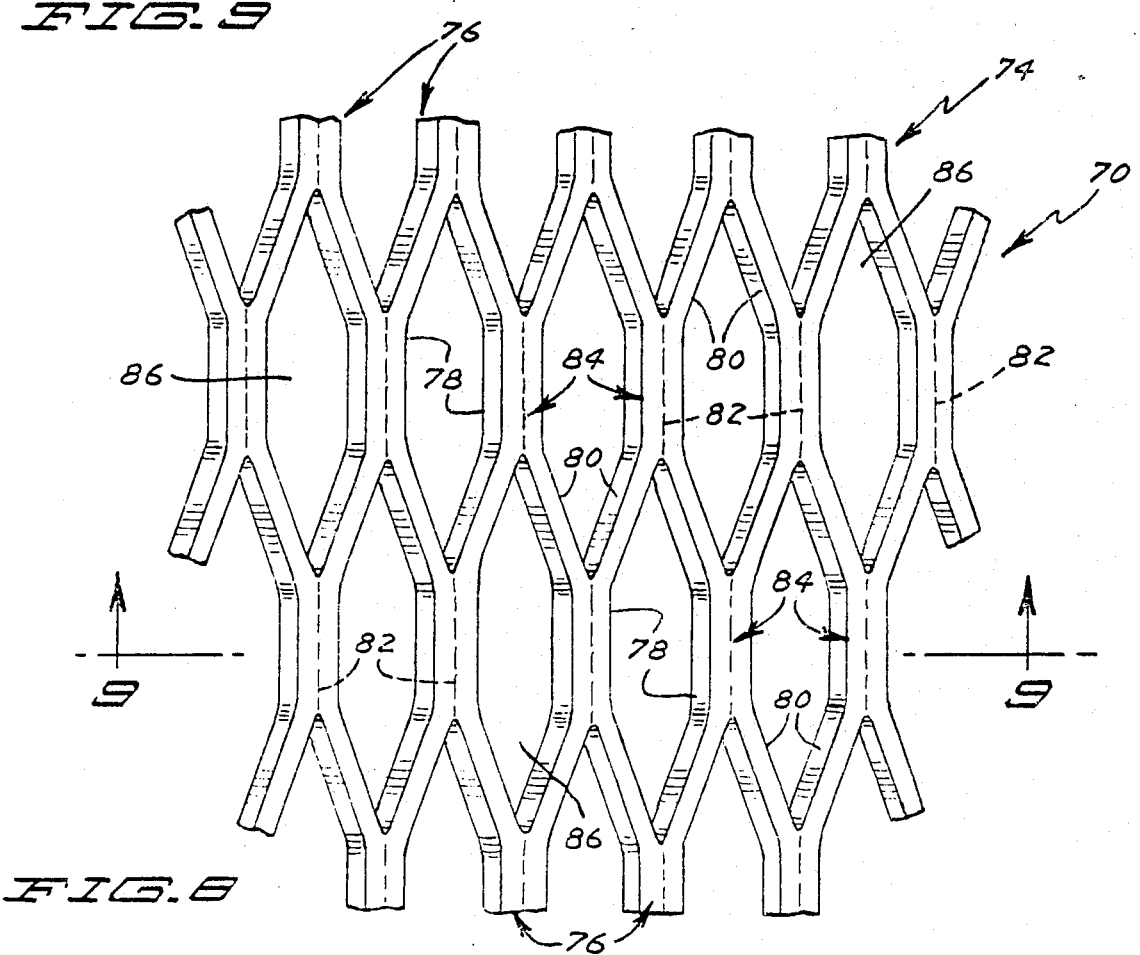
FIG. 8 is a top plan view of a section of the expanded grating, the grating being oriented in the same direction as in FIG. 6.

Playing an important role in the practicing of my invention is an expanded grating 70 comprised of two identical panel sections 72 and 74. In actual practice, iron grating material having a gauge of 6.25 pounds per square foot has proved exceedingly satisfactory. The grating 70, as best understood from FIG. 8 is composed of a number of rods 76 having a square cross section and a zig-zag longitudinal appearance when viewed from above or below. This zig-zag appearance can be readily understood from FIG. 8 where it will be seen that each rod 76 includes longitudinally spaced parallel portions 78 and longitudinally spaced angled portions 80. The parallel portions 78 of two adjacent rods 76 are resistance welded at 82 to form combined sloping surfaces at 84. See especially FIG. 9. As can be discerned from FIG. 8, the undulated or wavy configuration of the rods 76 when welded together form elongated six-sided openings 86 which could be described as stretched hexagonal openings. In actual practice, when using expanded grating having the previously mentioned 6.25 pounds per square foot gauge the openings 86 have a length of 3 inches and a width of 1 inch. For this gauge, the rods 76 should have a square cross section with each side having a width of 5/16 inch.

All four sides of each section 72 and 74 are welded at 89. From FIG. 7, it can be readily seen that the portion 89a of the weld 89 appearing in this view is substantially midway of the height of the vertical flange 44b. As can also be appreciated from FIG. 6, the sections 72 and 74 are welded at 89b to the vertical flanges 40b, and also at 89c and 89d to the vertical sides 46c and 46d of the transverse beam 22. The weld portions 89a, 89b, 89c and 89d collectively constitute the weld 89.

It is important to appreciate that the plane of the grating 70 which includes the two grating sections 72 and 74 is elevated or raised relative to the lower surfaces of the wear strips 48 and 49. In this way, the wear strips 48 and 49 experience the greatest amount of wear inasmuch as they bear directly against the soil being leveled, the grating 70 thus being subjected mainly to the much softer soil resulting from the leveling action of the wear strips 48 and 49.

My apparatus 10 is designed to be attached to the front end of a small tractor 90 having a chasis 92 with wheels 94. The tractor 90 in the illustrated situation has a pair of side arms 96 and 98 that can be swung upwardly and downwardly through the agency of hydraulic cylinders 97 and piston rods 99. The two arms 96 and 98 move in unison by virtue of being connected together by a cross member 100.

At the forward ends of the side arms 96 and 98 is a coupler 102 comprised of a pair of laterally spaced pivotal arms 104 connected together by a cross member or plate 106. The auxillary arms 104 are actually pivoted to the forward or free ends of the side arms 96, 98 by means of pivot pins 108. A hydraulic cylinder 110 having a piston rod 112 rocks the coupler 102 about the pivot pins 108 to obtain the various tilted or angular positions of the apparatus 10.

As best viewed in FIG. 6, each of the auxillary arms 104 is provided with a web 113 having an upper integral finger 114 that engages beneath a ledge or strip 116 associated with each of the earlier-mentioned channel members 34 and 36. The tractor 90, which is preferably a well-known Bob Cat tractor, has a special mechanism linkage 118 with pins 119 formed with a square cross section and tapered lower ends 119a that can be projected through correspondingly shaped holes 122 in a flange 124 integral with the web 113 and then into pin-receiving holes 126 contained in flanges 128 at the lower ends of the channel members 34 and 36. Inasmuch as the linkage 118 is conventional, no need exists to fully illustrate it. However, for the sake of general completeness it can be pointed out that each pin 120 has a rod 130 extending upwardly therefrom through an encircling coil spring 132 that biases the pin 120 downwardly into its hole 122. A pivotally mounted handle 134, when rotated upwardly overcomes the biasing of the rod 130 by way of the spring 132 with which it is associated so as to retract the pin 120 in each instance and thus uncouple or detach my apparatus 10 from the tractor 90. Actually, the manner in which my apparatus 10 is attached to a vehicle is relatively unimportant to a practicing of the invention as long as a rigid coupling is effected.

From the information that has been given, it is felt that the benefits to be derived from a practicing of my invention can be readily understood. Nonetheless, a brief operational description will assist in obtaining a full appreciation of the invention's value.

In this regard, attention is drawn to FIGS. 1 and 6. In these views the ground or soil being leveled has been indicated by the reference numeral 120. The hydraulic cylinder 110 has swung the apparatus 10 into a horizontal position so that when the tractor 90 moves the apparatus 10 in either direction over the soil 120 there is simply a scraping action produced by the wear strips 48 and 49. Inasmuch as the flanges 42a and the beveled edges 48a slope upwardly, there is a certain amount of soil 120 that is scooped upwardly onto the upper side of the expanded grating 70. From the automatic jostling that occurs when the apparatus 10 is reciprocated by driving the tractor 90 forwardly and rearwardly some of the soil on top of the apparatus will be sifted downwardly through the openings 82 in the two sections 72 and 74 of the grating 30. In other words, particles of the elevated soil small enough to pass through the openings 86 will soon do so, returning to the soil 120 therebeneath that is being graded or leveled.

Figure 2:
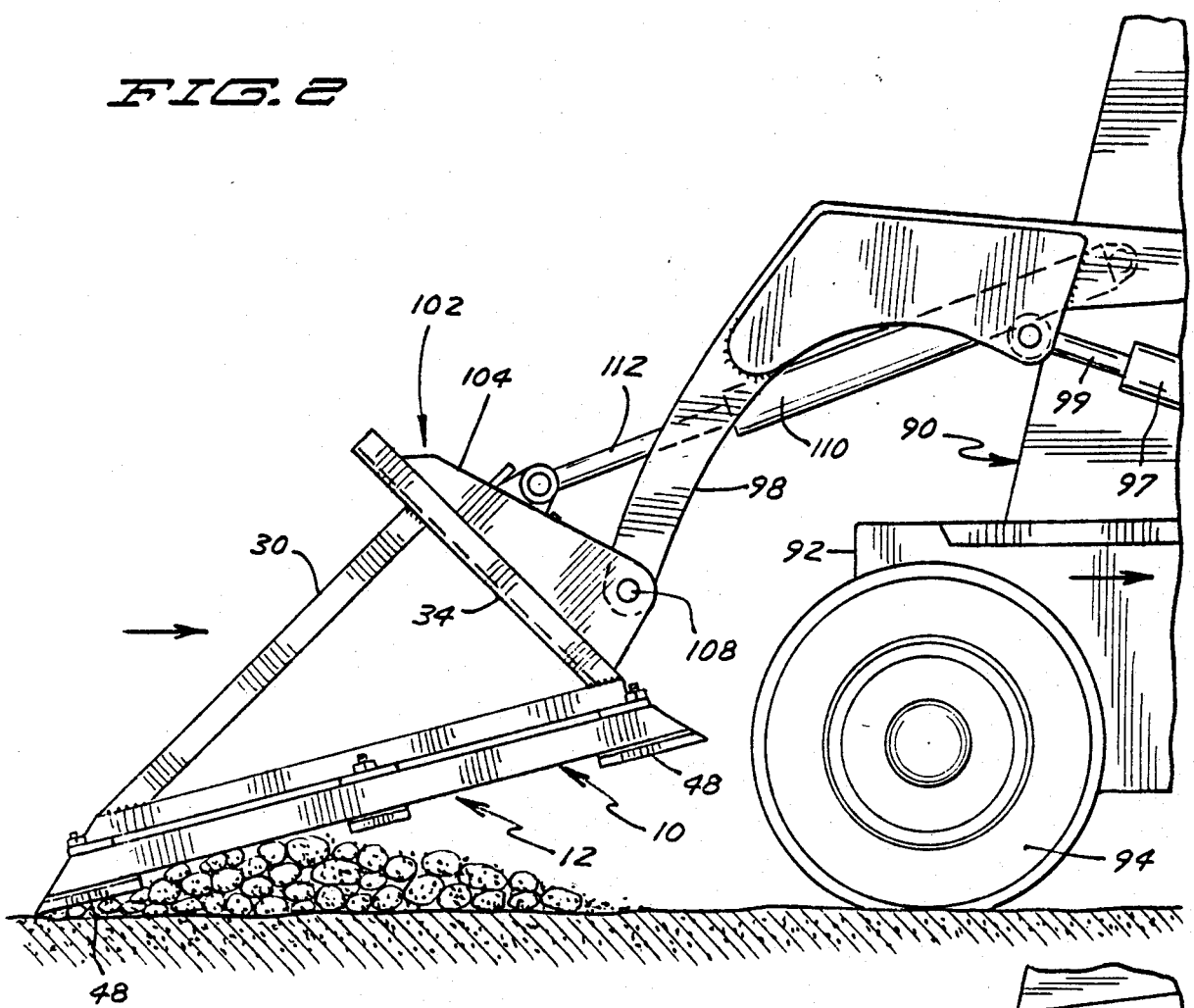
FIG. 2 is a side elevational view of the apparatus, the tractor moving to the right and the apparatus tilted so as to break up and pulverize a large percentage of the underlying and oversized soil that has been previously collected and dumped onto the ground.
Figure 3:
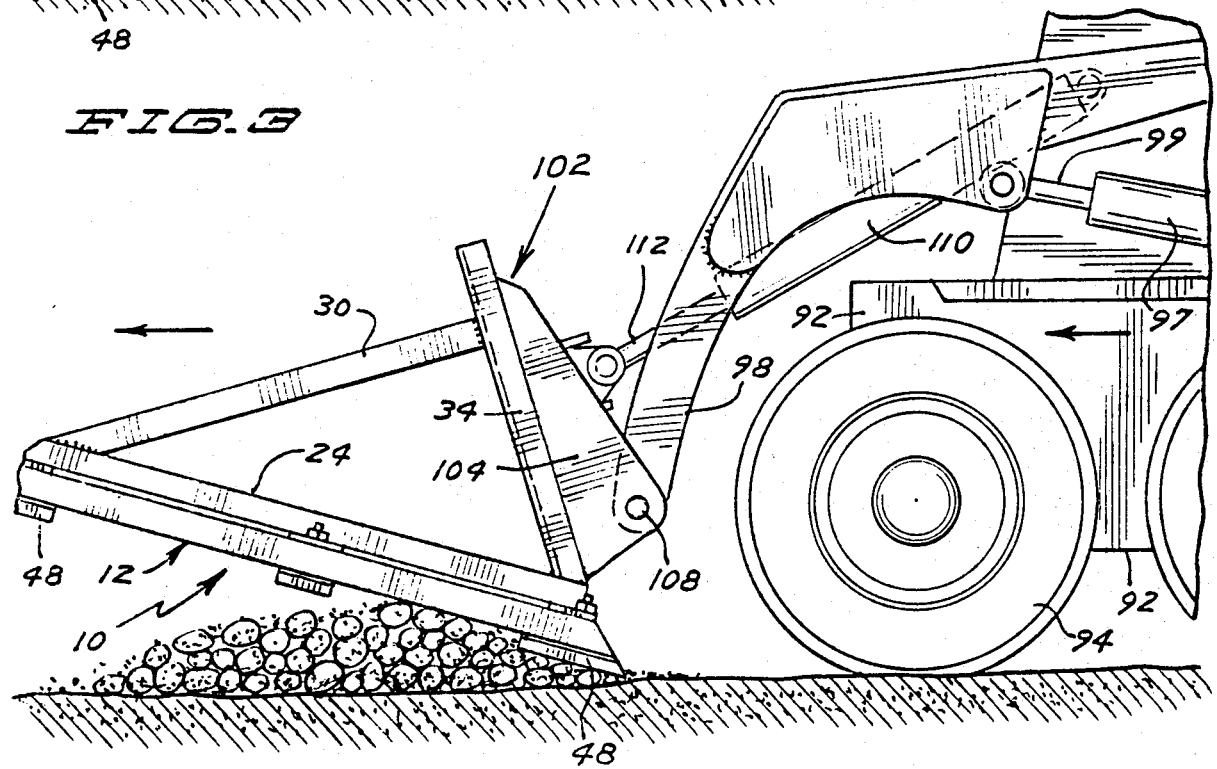
FIG. 3 is a view similar to FIG. 2 but with the tractor moving in an opposite direction.

The invention takes into account that the soil 120 can vary considerably as far as its hardness is concerned. Sometimes the soil 120 will be compacted, sometimes composed of hard clay, and sometimes containing therein a sizable number of stones and rocks. In order to literally dig into the soil 120 when a hard condition is encountered, the invention plans that the apparatus 10 be tilted either into the position appearing in FIG. 2 or that illustrated in FIG. 3. In either situation, the sloping flange 42a and the associated beveled edge 48a will scoop the soil 120 so that a portion is forced onto the upper side of the grating 70. As with FIGS. 1 and 6, it is not believed necessary to show any soil 120 on top of the apparatus 10 in FIGS. 2 and 3. In this regard, it will be understood that the grating 70 will allow sufficiently small particles of soil 120 to be sifted downwardly, large chunks and clods will remain on top of the grating 70.

Although the invention contemplates transporting rocks and debris to a disposal location, it is intended that chunks and clods of soil be broken up by merely dumping them back onto the ground being leveled. Some chunks and clods of soil that have been so deposited have been shown beneath my apparatus 10 in FIGS. 2 and 3. By moving the tractor 90 rearwardly or to the right as viewed in FIG. 2 a portion of the underlying chunky material can be broken up or pulverized with a single rearward pass. Most of any remaining chunks can then be pulverized by tilting the apparatus into the position pictured in FIG. 3 followed by a forward movement of the tractor 90 to the left as viewed in FIG. 3. Continued movement, if needed, to either the right or the left as viewed in FIGS. 2 and 3, respectively, will pulverize more and more of the underlying chunks and clods so that the pulverized soil can then be spread with the apparatus 10 horizontal as depicted in FIG. 1.

In effecting a normal leveling of the soil 120, the tractor 90 moves forwardly and rearwardly in smoothing the soil 120 with my apparatus 10 oriented in a horizontal position, as in FIGS. 1 and 6. Any material of a size sufficiently small to pass through the openings 86 will do so if allowed to do this, thereby providing a sifting action that returns some of the soil back to the soil 120 being leveled. On the other hand, there are at times a considerable amount of stubble, as well as rocks, stones and chunks of clay that must be completely removed and my invention readily provides a means for doing this. Thus, oversized material in the form of rocks have been given the reference numeral 120a in FIG. 4. The soil that has been sifted back is not shown but since the rocks 120a are too large to pass through the openings 86, they are retained on the upper surfaces of the grating sections 72 and 74. The tractor 90 can then move the apparatus 10 to a site where the rocks 120a can be disposed of. However, chunks and clumps of soil can be broken up with the back and forth procedure of FIGS. 2 and 3.

At any rate, the information and description that has been given should illustrate that my apparatus 10 when attached to an appropriate vehicle is exceptionally versatile. It can perform any or all of these operations: (1) leveling, (2) sifting, (3) pulverizing, or (4) transporting, all of which will contribute to a rapid leveling and grading of virtually all types of soil that are likely to be encountered, especially that found in landscaping operations.

I claim:

1. Soil grading apparatus comprising a generally rectangular frame forming an opening, means attached to said frame for engaging soil to be graded, grating means attached to said frame and extending across said opening at an elevation above said means for engaging the soil to be graded, said grating means having a plurality of openings therein for sifting sufficiently small particles of soil downwardly and retaining relatively large chunks and clods on top thereof, and means for tiltably mounting said frame on a vehicle, whereby movement of said frame by said vehicle across the soil to be graded at selected angles causes some of said soil, to be shoved onto the upper surface of said grating means while performing the soil grading function in which sufficiently small particles of soil are sifted downwardly and relatively large chunks and clods remain on top thereof.

2. Soil grading apparatus comprising a frame including front and rear transverse beams and laterally spaced side beams, a wear strip secured beneath each of said transverse beams having a length coextensive with the transverse beam to which it is secured for engaging soil to be graded, and expanded grating means extending between said various beams at an elevation above said wear strips, said expanded grating means sifting sufficiently small particles of soil downwardly and retaining relatively large chunks and clods on top thereof.

3. Soil grading apparatus comprising a generally rectangular frame forming an opening, means attached to said frame for engaging soil to be graded, grating means attached to said frame and extending across said opening, said grating means having a plurality of openings therein for sifting sufficiently small particles of soil downwardly and retaining relatively large chunks and clods on top thereof, and means for tiltably mounting said frame on a vehicle, whereby movement of said frame at selected angles by said vehicle across the soil to be graded causes some of said soil to be shoved onto the upper surface of said grating means, said frame having at least one sloping edge integral therewith for facilitating the shoving of some of said soil onto said grating means at said selected angles in performing the soil grading function during which sufficiently small particles of soil are sifted downwardly and relatively large chunks and clods remain on top of said grating means.

4. Soil grading apparatus in accordance with claim 3 in which said grating mans is attached to said frame at an elevation above the soil engaging surface thereof.

5. Soil grading apparatus comprising a generally rectangular frame forming an opening and including means having a soil-engaging surface, grating means attached to said frame and extending across said opening at an elevation above the soil-engaging surface, said grating means having a plurality of openings therein for sifting sufficiently small particles of soil downwardly and retaining relatively large chunks and clods on top thereof, whereby movement of said frame by said vehicle across the soil to be graded causes some of said soil to be shoved onto the upper surface of said grating means, said grating means sifting sufficiently small particles of soil downwardly and retaining relatively large chunks and clods on top thereof while performing the soil grading function, said frame having a first sloping edge at the front of said frame and a second sloping edge at the rear of said frame, said edges facilitating the shoving of some of said soil onto said grating means.

6. Soil grading apparatus in accordance with claim 5 including a wear strip detachably secured beneath each of said sloping edges.

7. Soil grading apparatus comprising a frame including front and rear transverse beams and laterally spaced side beams, said front transverse beam including a member providing a forwardly and downwardly sloping surface and said rear beam including a member providing a rearwardly and downwardly sloping surface, means secured to the underside of said front and rear transverse beams for engaging soil to be graded, and expanded grating means extending between said various beams at an elevation above said means for engaging the soil to be graded so that when said frame is moved forwardly across the soil to be graded some of the soil is shoved onto the upper surface of said grating means through the agency of the member providing the forwardly and downwardly sloping surface and when said frame is moved rearwardly across the soil to be graded some of the soil is shoved onto the upper surface of said grating means through the agency of the member providing the rearwardly and downwardly sloping surface, whereby said grating means sifts sufficiently small particles of soil downwardly and retains relatively large chunks and clogs on the top thereof.

8. Soil grading apparatus comprising a frame including a front and a rear transverse beams and laterally spaced side beam, each of said transverse beams including a first angle member having a horizontal flange and a vertical flange, and each of said transverse beams further including a second angle member having inclined flanges forming an apex beneath said horizontal flanges, the apex of each second angle member being secured to the underside of the horizontal flange of each first angle member with which the apex is associated, a wear strip detachably secured to the lower edges of said inclined flanges associated with the front transverse beam, a wear strip detachably secured to the lower edges of said inclined flanges associated with the rear transverse beam, one of the inclined flanges of the front transverse beam sloping downwardly and forwardly whereby movement of said frame forwardly across the soil to be graded causes some of said soil to be shoved upwardly and one of the inclined flanges of the rear transverse beam sloping downwardly and rearwardly whereby movement of said frame rearwardly across the soil to be graded causes some of said soil to be shoved upwardly, and expanded grating means extending between said various beams at an elevation above the lower edges of said vertical and inclined flanges for receiving the soil shoved upwardly through the agency of either of said downwardly and forwardly or said downwardly and rearwardly inclined flanges, whereby sufficiently small particles of soil are sifted downwardly through said expanded grating means and relatively large chunks and clods remain on top thereof.

9. Soil grading apparatus in accordance with claim 8 including a plurality of bolts extending upwardly through said wear strips, through said apices and through said horizontal flanges to detachably secure said wear strips beneath said sloping edges.

10. Soil grading apparatus in accordance with claim 9 including an intermediate beam extending between said laterally spaced side beams and in which said expanded grating means includes a first section extending between said front beam and said intermediate beam, and includes a second section extending between said rear beam and said intermediate beam.

11. Soil grading apparatus in accordance with claim 10 in which said side beams each include a horizontal flange and a vertical flange, said sections being secured to the vertical flanges of said front and rear transverse beams, secured to the vertical flanges of said side beams, and secured to said intermediate beam.

12. Soil grading apparatus in accordance with claim 11 in which each of said grating sections is secured to said flanges in a plane above said wear strips.

13. Soil grading apparatus in accordance with claim 12 in which said grating means includes a plurality of rods having longitudinally spaced parallel portions and angled portions intermediate said parallel portions, the parallel portions of one rod being welded to the parallel portions of adjacent rods to form a plurality of openings.

14. Soil grading apparatus in accordance with claim 13 in which each of said rods has a square cross section with the sides of the welded portions sloping downwardly in the direction of said rear beam.

15. Soil grading apparatus in accordance with claim 14 in which said rods are formed with flat sides having a width of approximately 5/16 inch, and in which said openings are elongated, each having a length of approximately three inches and a width of approximately one inch.

16. Soil grading apparatus in accordance with claim 15 in which said openings are elongated in a direction parallel to said front and rear beams.

* * * * *